United States Patent [19]

Abali et al.

[11] Patent Number: 5,701,446
[45] Date of Patent: Dec. 23, 1997

[54] METHOD FOR FINE GRAIN ADJUSTMENTS TO SYSTEM TIME IN COMPUTER SYSTEMS

[75] Inventors: Bulent Abali, New York; Ronald Mraz, Millwood, both of N.Y.

[73] Assignee: International Business Machines Corporation, Armonk, N.Y.

[21] Appl. No.: 489,180

[22] Filed: Jun. 9, 1995

[51] Int. Cl.$^6$ ........................................ G06F 1/14
[52] U.S. Cl. ................... 395/551; 395/553; 395/558; 395/559
[58] Field of Search ................... 395/550, 700, 395/182.1, 551, 553, 558, 559; 364/270, 271, 271.1, 271.2, 271.3, 145

[56] References Cited

U.S. PATENT DOCUMENTS

| | | | |
|---|---|---|---|
| 4,531,185 | 7/1985 | Halpern et al. | 364/200 |
| 4,575,848 | 3/1986 | Moore et al. | 371/61 |
| 4,584,643 | 4/1986 | Halpern et al. | 364/200 |
| 5,327,468 | 7/1994 | Edblad et al. | 375/107 |
| 5,526,515 | 6/1996 | Ross et al. | 395/550 |
| 5,530,846 | 6/1996 | Strong | 395/550 |

OTHER PUBLICATIONS

Ramanathan et al., "Hardware–Assisted Software Clock Synchronization for Homogeneous Distributed Systems", IEEE Trans. On Computer, V. 39, N. 4, Apr. 1990, pp. 514–524.

Kolstad, "The Network Time Protocol", UNIX Review, V. 8, N. 12, Dec. 1990, pp. 58–61.

D.L.Mills, "Precision synchronization of Computer Network Clocks$^{1,2}$" ACM SIGCOMM, Computer Communication Review, Apr. 1994 pp. 28–43.

Primary Examiner—Dennis M. Butler

[57] ABSTRACT

A method for performing fine grain time adjustments in computer systems. A fine grain time adjustment can be completed in the first interrupt instead of doing it piecewise over many interrupts. If the adjustment offset is less than or equal to a threshold, then the clock is adjusted in the first clock interrupt; if the adjustment offset is greater than the threshold, then the clock is adjusted over a number of interrupts with an adjustment by an amount equal to the threshold per interrupt.

4 Claims, 2 Drawing Sheets

METHOD FOR FINE GRAIN ADJUSTMENTS TO SYSTEM TIME IN COMPUTER SYSTEMS

FIELD OF THE INVENTION

The invention relates to time adjustments in computer systems.

BACKGROUND OF THE INVENTION

In AIX 3.2, time-of-day adjustments are made by a routine called ADJTIME. ADJTIME works only for coarse grain time adjustments unless hardwired kernel variables are altered by the application. Because fine grain time adjustments are critical within a parallel or distributed computing environment, however, such course grain adjustments hinder the performance of database queries and updates, Numeric Intensive Computing (NIC) tracing and profiling, and real-time applications such as interactive video service.

Here we describe a replacement routine which is called USADJTIME for making fine grain adjustments (finer by a factor of 1000). USADJTIME can be used as a replacement for ADJTIME, or it can be used as a kernel extension which may coexist with ADJTIME.

SUMMARY OF THE INVENTION

The invention is a method for adjusting system time in a computer system, comprising the steps of:
 determining an amount D by which the time must be adjusted;
 if D is greater than or equal to a threshold, incrementally adjusting the time;
 if D is less than the threshold, adjusting the time in a single step.

FIGURES

DETAILED DESCRIPTION OF THE INVENTION

AIX clock is adjusted forward or backward by the amount of the ADJTIME offset. ADJTIME allows coarse grain adjustments—an offset of 1 millisecond (mS) or more. Further, an offset not an integral multiple of 1 mS (in AIX 3.2.5) is truncated to the nearest millisecond. For example, an offset of 0.4 mS is truncated to 0 mS which results in no adjustment at all. So, one cannot make fine grain adjustments with current implementations of ADJTIME.

To be able to perform fine grain time adjustments, for example with an offset of 1 microsecond (us), one is tempted to improve ADJTIME by changing the hardwired constant TICKADJ=1 mS in the ADJTIME source code to TICKADJ=1 µS. However, in practice that doesn't work. In the following we describe the reason, then we describe how our invention provides a solution to this problem.

Figure 1:
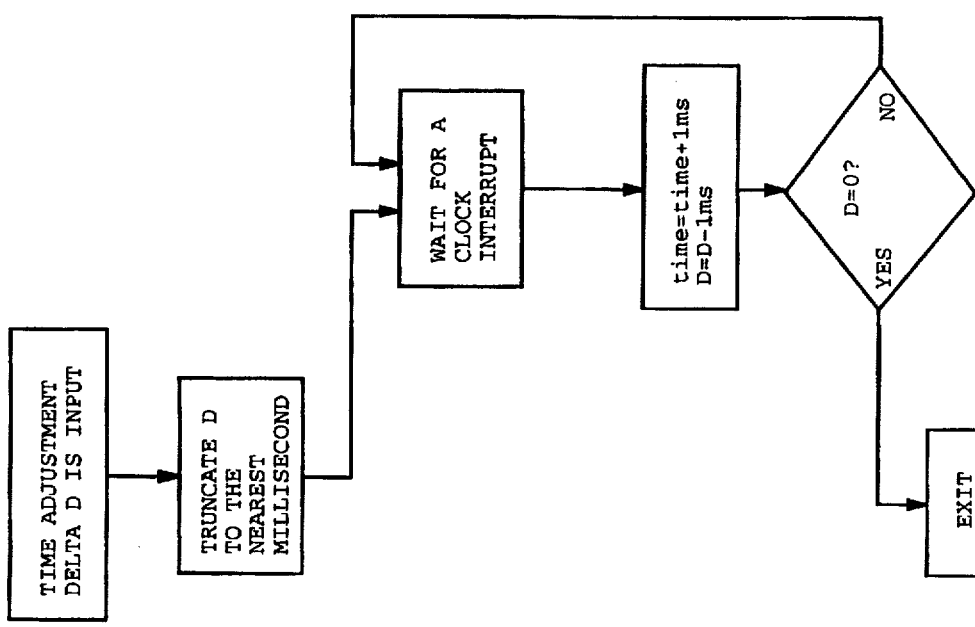
FIG. 1 is a flow diagram of the ADJTIME routine.

The flow diagram of FIG. 1 depicts the ADJTIME routine. When ADJTIME is called with an offset of D milliseconds, where D is an integer, AIX adjusts the time—piecewise—over a period of D clock interrupts with an adjustment of 1 mS per interrupt. There are 100 clock interrupts per second. For example, assume that ADJTIME is called with an offset of 8 mS to adjust the clock forward. In the first interrupt AIX will put the clock forward by 1 mS, in the second interrupt by another 1 mS, and after the 8th interrupt the adjustment will be complete. If TICKADJ were set to 1 µS, then it would take 8000 clock interrupts to complete the adjustment.

There is a side-effect of adjusting time, however, due to the processor execution overhead associated with the time adjustment. If any adjustment is pending, in each clock interrupt, AIX must (a) read from the clock, (b) add an offset of TICKADJ to the value read, (c) write the result to the clock. Steps (a)–(c) can take about (depending on the processor speed) 10–60 µS which we call the "time adjustment overhead". The overhead is the time lost during each clock interrupt in which an adjustment is made. Going back to the previous example, assume that the overhead is 50 µS and assume that ADJTIME is called with an offset of 8 mS to put the clock forward. If it takes 8 timer interrupts to complete the adjustment, then the total overhead will be (8*50 µS)=400 µS. It means that relative to a wall clock, the actual adjustment will be (8–0.4)=7.6 mS. Now, let's assume that TICKADJ=1 µS. It will take 8000 interrupts to advance the clock by 8 mS. The overhead will be (8000*50 µS)=400 mS. It means that relative to a wall clock, the actual adjustment will be (8–400 mS)=–392 mS due to the overhead. Thus, in an attempt to put the clock forward by 8 mS, we actually put it back by –392 mS relative to a wall clock. The overhead is the main reason why ADJTIME cannot do fine grain adjustments.

The solution to the problem is as follows: a fine grain adjustment can be completed in the first interrupt instead of doing it piecewise over many interrupts. Thus, the overhead is paid for only once. The USADJTIME routine shown below does exactly that: if the adjustment offset is less than a threshold (here, 1 mS) then the clock is adjusted in the first clock interrupt; if the adjustment offset is greater than or equal to the threshold, then the clock is adjusted over a number of interrupts with an adjustment of threshold per interrupt.

Figure 2:
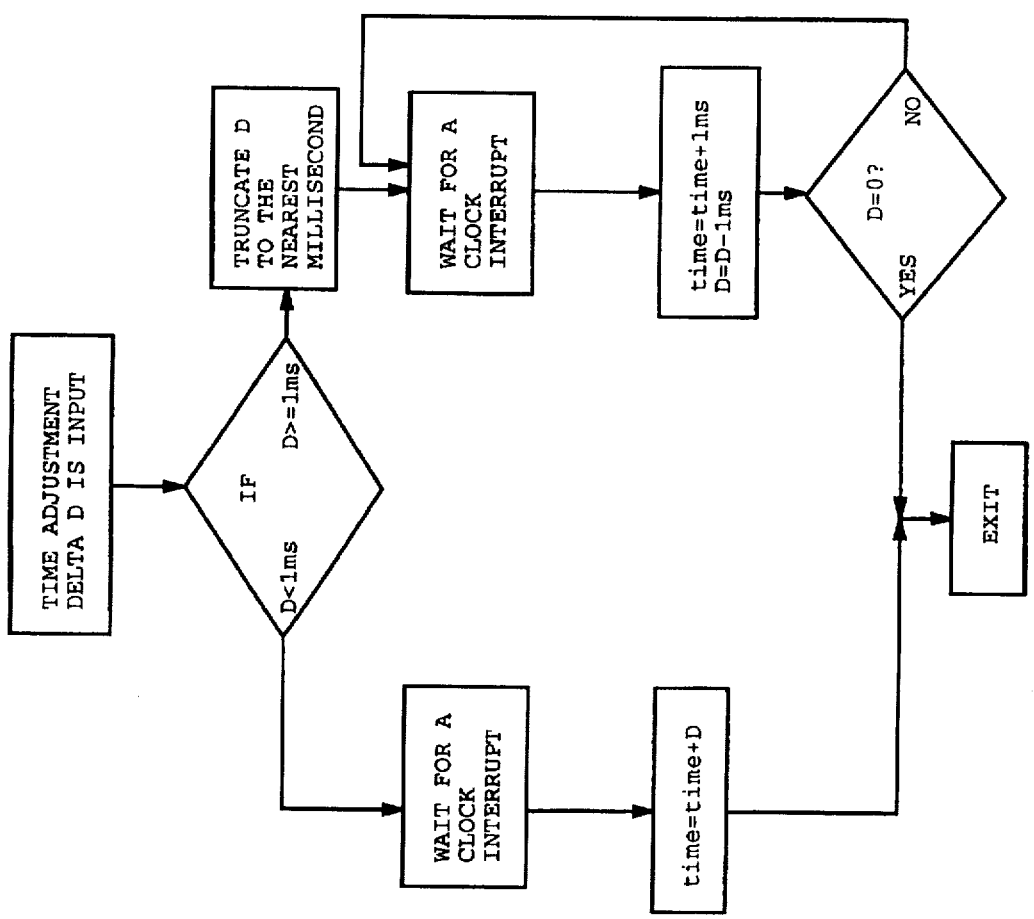
FIG. 2 is a flow diagram depicting the method of the present invention.

One embodiment of the method of the present invention is described in the flowchart of FIG. 2. In the first step, a time adjustment of delta D is input. If D is less than a threshold (in one embodiment of the invention, for use in UNIX type systems, this threshold is 1 mS), then the time is set to the value of (time+D), after a clock interrupt. If, however, D is greater than or equal to the threshold, D is first truncated to the nearest integral multiple of the threshold, and the time is then incrementally reset by one threshold unit. If the first incremental reset results in D being reduced to zero, then the procedure quits. If, however, D has not yet been reduced to zero, the steps of adjusting the time and decrementing D repeats.

In another embodiment of the invention, the step of truncating D can be eliminated. Thus, in this embodiment, when D is greater than or equal to the threshold, time is adjusted by an amount equal to one threshold, and D is reduced by a like amount. If D does not yet equal zero, it is again determined whether D is less than the threshold. If it is, the time is adjusted by D. If not, time is again reduced by an amount equal to the threshold, and D is reduced by a like amount, and so on.

Industry Analysis

Manufacturers of time synchronized machines rely on two methods to apply fine grain synchronization of Time-of-Day Clocks. They are a centralized lock facility, or careful coding of the ADJTIME routine to minimize the time delta described above. These solutions are hardware and software based, respectively.

An example of the hardware solution is the Parallel Sysplex Timer facility used in the IBM S/390 Parallel Servers for Data Base Querys. (IBM Manual) G326-0416-00. The Sysplex Timer is an IBM unit that synchronizes time-of-day (TOD) clocks in multiple processors or processor sides.

Examples of typical software solutions are those by Digital Equipment Corp. (TM) and Hewlet Packard (TM) in their parallel machines. They have carefully coded the ADJTIME routine to reduce the delay of clock updates to less than 2 micro-seconds. (See D. Mills, April, 1994, Computer Communication Review).

---

Source Code for an Embodiment of the Invention

```
/*
 *
 * PURPOSE: adjtime() subroutine truncates time adjustment requests
 * to integral boundaries of 1 millisecond. Therefore it is not
 * suitable
 * for fine grain adjustments.
 *
 * usadjtime() is a kernel extension that
 * allows for microsecond granularity time adjustments.
 * Load it into kernel with the sysconfig() subroutine.
 */
#include <sys/types.h>    /* always needed */
#include <sys/adspace.h>  /* for the WRITE_CLOCK macro to work*/
#include <sys/time.h>     /* for the timeval structure */
#include <sys/param.h>    /* to define the HZ label */
#include <sys/mstsave.h>  /* mstsave area def. for asserting */
#include <sys/user.h>     /* the u structure to return errno's */
#include <sys/errno.h>    /* define the errno's to be returned */
#include <sys/syspest.h>  /* for the ASSERT and assert macros */
#include <sys/intr.h>     /* for the serialization stuff */
#include <sys/low.h>      /* access the csa for asserts */
#include <sys/machine.h>  /* for machine model macros */
#include <sys/systemcfg.h> /* for system config structure */
#include <sys/uio.h>
#include <sys/device.h>
#include <sys/pin.h>
int usadjtime(struct timeval *delta, struct timeval *olddelta)
{
    struct timeval atv;  /* timeval to adjust by */
    struct timeval oatv; /* old timeval to adjust by */
    int uSdelta;         /* current clock skew, us. per tick */
    long timedelta;      /* unapplied adjtime correction, us. */
    register int ipri;   /* caller's interrupt priority */
    int timeadjusted = 1;
    int trunc = 100;
    register long ndelta;
    /* ASSERT(csa->prev == NULL); */
    if(privcheck(SYS_CONFIG) == EPERM) {
        /* u.u_error = EPERM; */
        return(-1);
    }
    /* copy 1st argument to atv */
    if((copyin((caddr_t)delta, (caddr_t)&atv,
        sizeof(struct timestruc_t))) != O) {
        /* u.u_error = EFAULT; */
        return(-1);
    }
    if ( atv.tv_usec == O && atv.tv_sec == O ) {
        /* return the remaining time */
        ipti = i_disable(INTMAX);
        kgettickd( &timedelta, &uSdelta, &timeadjusted);
        (void)i_enable (ipri);
        if(olddelta != NULL) {
            oatv.tv_sec = timedelta / 1000000;
            oatv.tv_usec = timedelta % 1000000;
            (void)copyout((caddr_t)&oatv, (caddr_t)olddelta,
                sizeof (struct timeval));
        }
        return(O);
    }
    ndelta = atv.tv_sec * 1000000 + atv.tv_usec;
    *trunc = 1000; /* 1 ms */
    if ( (ndelta <= trunc) && (ndelta >= (-1 * trunc) ) ) {
        /* do it in the first tick */
        uSdelta = ( ndelta > 0 ) ? ndelta : ( -1 * ndelta );
        timedelta = ndelta; /* time to correct by */
        timeadjusted = TRUE;
    }
    else {
        /* do it in trunc uS increments */
        uSdelta = trunc;
```

---

Source Code for an Embodiment of the Invention

```
        timedelta = (ndelta / trunc) * trunc; /* truncate to nearest */
        /* oscillations may occur if timedelta is not an integer
           multiple of uSdelta */
        timeadjusted = TRUE;
    }
    /* update kernel vars */
    ipri = i_disable(INTMAX);
    ksettickd( &timedelta, &uSdelta, &timeadjusted);
    (void)i_enable(ipri);
    /* copy out to 2nd argument */
    if(olddelta != NULL) {
        oatv.tv_sec = timedelta / 1000000;
        oatv.tv_usec = timedelta % 1000000;
        (void)copyout((caddr_t)&oatv, (caddr_t)olddelta,
            sizeof (struct timeval));
    }
    return (O);
}
/* called only when the code is loaded */
int usadj_cfg(int cmd, struct uio *uio)
{
    if ( cmd == CFG_INIT ) {
        if ( pincode (usadjtime) != O )
            return (-1);
    }
    else {
        unpincode (usadjtime);
    }
    return (O);
}
------------------------makefile-----------------------
MACHDEFS = -DNLS -DMSG '-DMACHNAME="R2_System"' \
           -DMACHINE=_IBMR2 -D_IBMR2
KDEFS = -D_AIX -D_KERNEL -DTRACE $(MACHDEFS)
IMPORT = -bI:/lib/kernex.exp -bI:/lib/syscalls.exp
UIMPRT = -bI:./usadj.exp
usadj: usadj.c
        $(CC) -c $(KDEFS) usadj.c
        ld -o $@ $@.o $(IMPORT) -bE:./$@.exp -e usadj_cfg
sample: $$@.c
        $(CC) -Q -O -c sample.c
        $(CC) -4 -o sample sample.o $(UIMPRT)
------------------------usadj.exp----------------------
#!/unix
usadjtime syscall
                                * * *
```

While the invention has been described in particular with respect to particular embodiments thereof, it will be understood by those skilled in the art that modifications to the disclosed embodiments can be effected without departing from the spirit and scope of the invention.

We claim:

1. A method for adjusting system time in a computer system, comprising the steps of:
   (a) determining an adjustment amount D by which the time must be adjusted;
   (b) if the adjustment amount D is greater than or equal to a threshold value, incrementally adjusting the time, including the steps of:
      (b1) truncating the adjustment amount D to the nearest integral multiple of the threshold value; and
      (b2) repeating the following steps (b3)–(b4) until the adjustment amount D equals zero:
      (b3) adjusting the time by an amount equal to the threshold value; and
      (b4) reducing the adjustment amount D by an amount equal to the threshold value; and
   (c) if the adjustment amount D is less than the threshold value, adjusting the time by the threshold value in a single step.

2. The method of claim 1, wherein when the adjustment amount D is equal to the threshold value, the time is adjusted in a single increment.

3. The method of claim 1, wherein the threshold value is equal to about 1 millisecond.

4. A method for adjusting system time in a computer system, comprising the steps of:

(1) determining an adjustment amount D by which the time must be adjusted;

(2) if the adjustment amount D is greater than or equal to a threshold value, incrementally adjusting the time, including the step of:

repeating the following steps (a)–(d) until the adjustment amount D equals zero:

(a) adjusting the time by an amount equal to the threshold value;

(b) reducing the adjustment amount D by an amount equal to the threshold value;

(c) if the adjustment amount D is now less than the threshold value, adjusting the time by an amount equal to the adjustment amount D, and setting the adjustment amount D equal to zero; and (d) if the adjustment amount D is greater than or equal to the threshold value, returning to step (a); and (3) if the adjustment amount D is less than the threshold value, adjusting the time by the threshold value in a single step.

\* \* \* \* \*